May 11, 1954   J. R. EDWARDS   2,678,138
FEEDING APPARATUS
Filed Aug. 8, 1950   5 Sheets-Sheet 1

INVENTOR
JAMES R. EDWARDS
BY
HIS ATTORNEYS

May 11, 1954 J. R. EDWARDS 2,678,138
FEEDING APPARATUS
Filed Aug. 8, 1950 5 Sheets-Sheet 4

INVENTOR
JAMES R. EDWARDS
BY
HIS ATTORNEYS

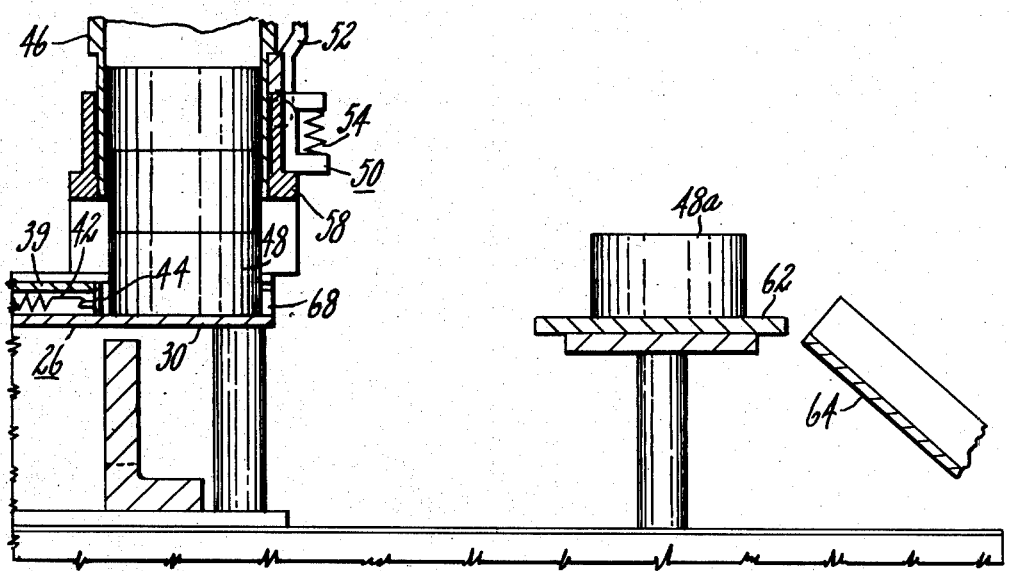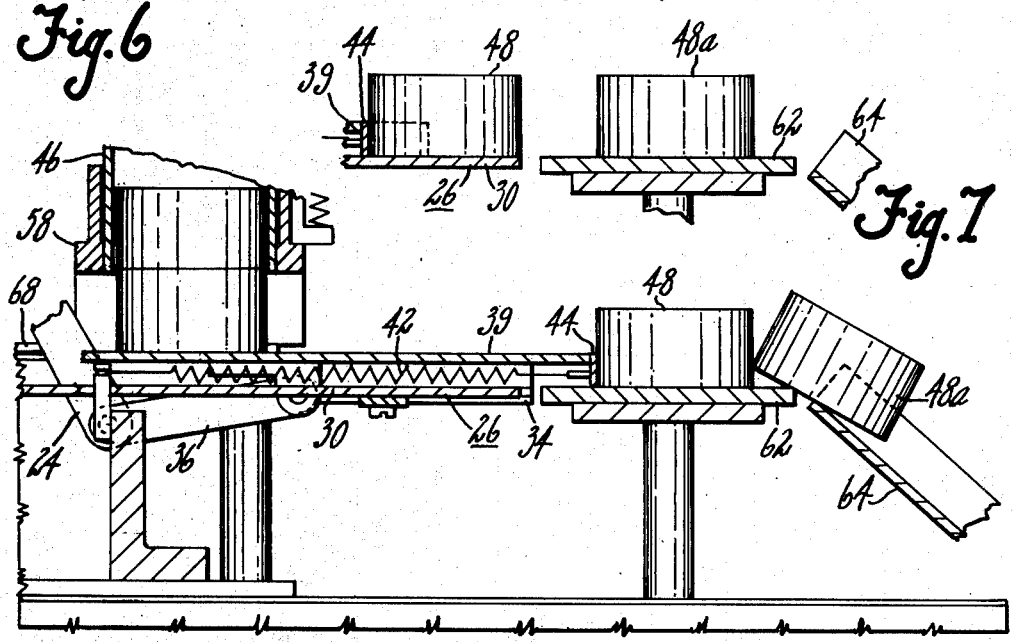

Patented May 11, 1954

2,678,138

UNITED STATES PATENT OFFICE 2,678,138

FEEDING APPARATUS

James R. Edwards, Middletown, Ind., assignor to General Motors Corporation, Detroit, Mich., a corporation of Delaware Application August 8, 1950, Serial No. 178,252

2 Claims. (Cl. 214—8.5)

1

This invention relates to apparatus for heating plastic materials.

It is an object of the present invention to provide an apparatus wherein plastic materials, such as thermosetting resins and related compounds, may be heated to any desired temperature and preferably to a temperature approximating but slightly less than the final curing temperature of the resin and wherein the said material may immediately be discharged from the heater and placed in a suitable molding die for the final molding and curing operations.

A further object of the invention is to provide an apparatus for automatically delivering preforms or pills of plastic material in the uncured state to a heating apparatus.

Further objects and advantages of the present invention will be apparent from the following description, reference being had to the accompanying drawings, wherein preferred embodiments of the present invention are clearly shown.

Figs. 6, 7 and 8 are fragmentary views showing the action of the delivery device wherein Fig. 6 shows a pill on the heating unit with a stack of pills in the delivery device; Fig. 7 shows the delivery device delivering a pill adjacent the heating device, while Fig. 8 shows the final portion of the delivery wherein the new pill is placed on the heating device and the heated pill is pushed off of the device into a chute.

In plastic molding operations, radio frequency heating is often utilized to preheat the material prior to the final molding operation wherein the material itself is brought to a temperature approaching its irreversible reaction temperature, in the case of thermosetting material, and approaching the final desired molding temperature in the case of thermoplastic materials. In all cases, the material is rendered flowable during the heating step and is brought to a temperature relatively close to the final curing temperature used during the molding operation. In most cases, the material heated is a preform containing the exact quantity of material desired to be used in the molded article. These hot preforms are then injected into or placed by hand in hot dies at the desired molding temperature and molded and cured to the exact shape and size desired.

The present invention, in its preferred form, is directed to a supply apparatus for preforms wherein preforms may be supplied automatically and in timed sequence to a radio frequency heating apparatus.

Figure 1:
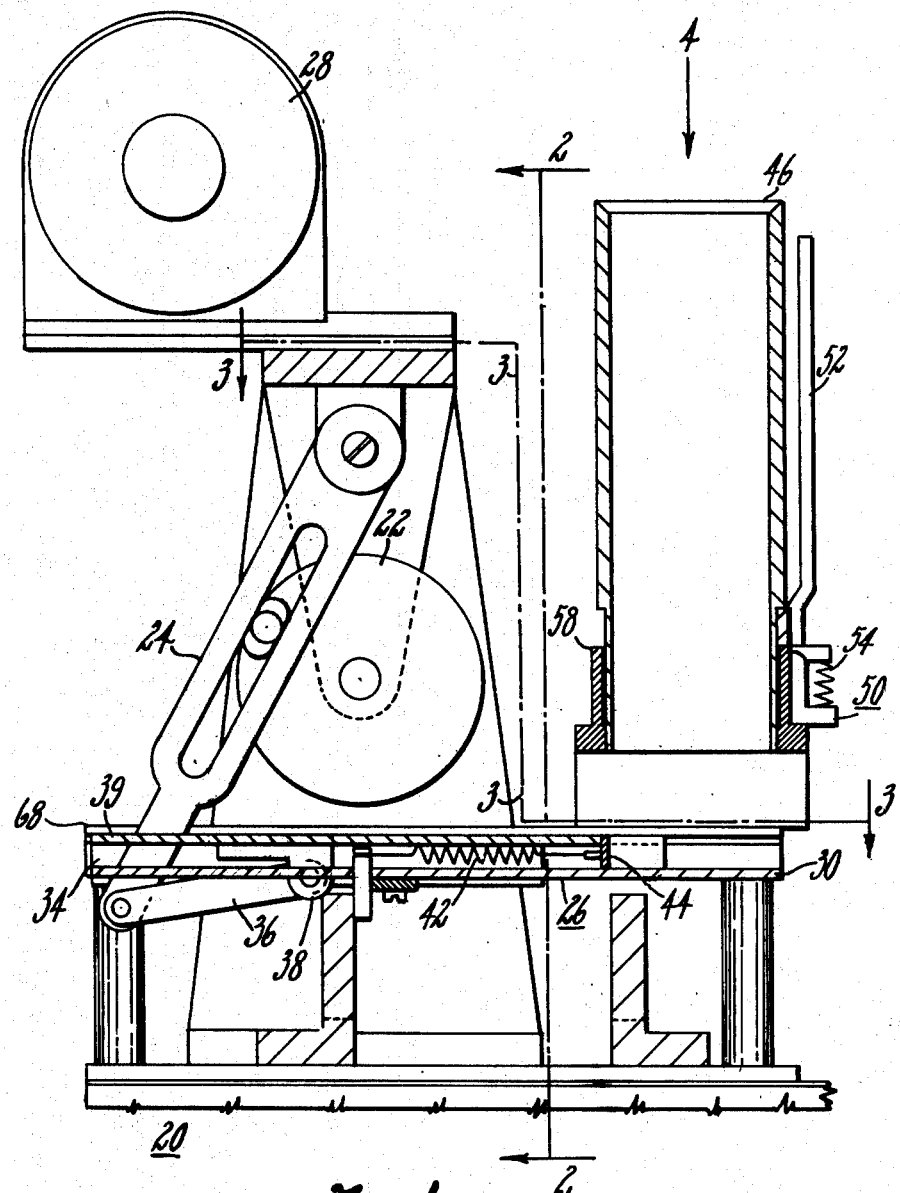
Fig. 1 is a side view, partly in section, of a delivery apparatus for delivering pills to a radio frequency heating unit.
Figure 2:
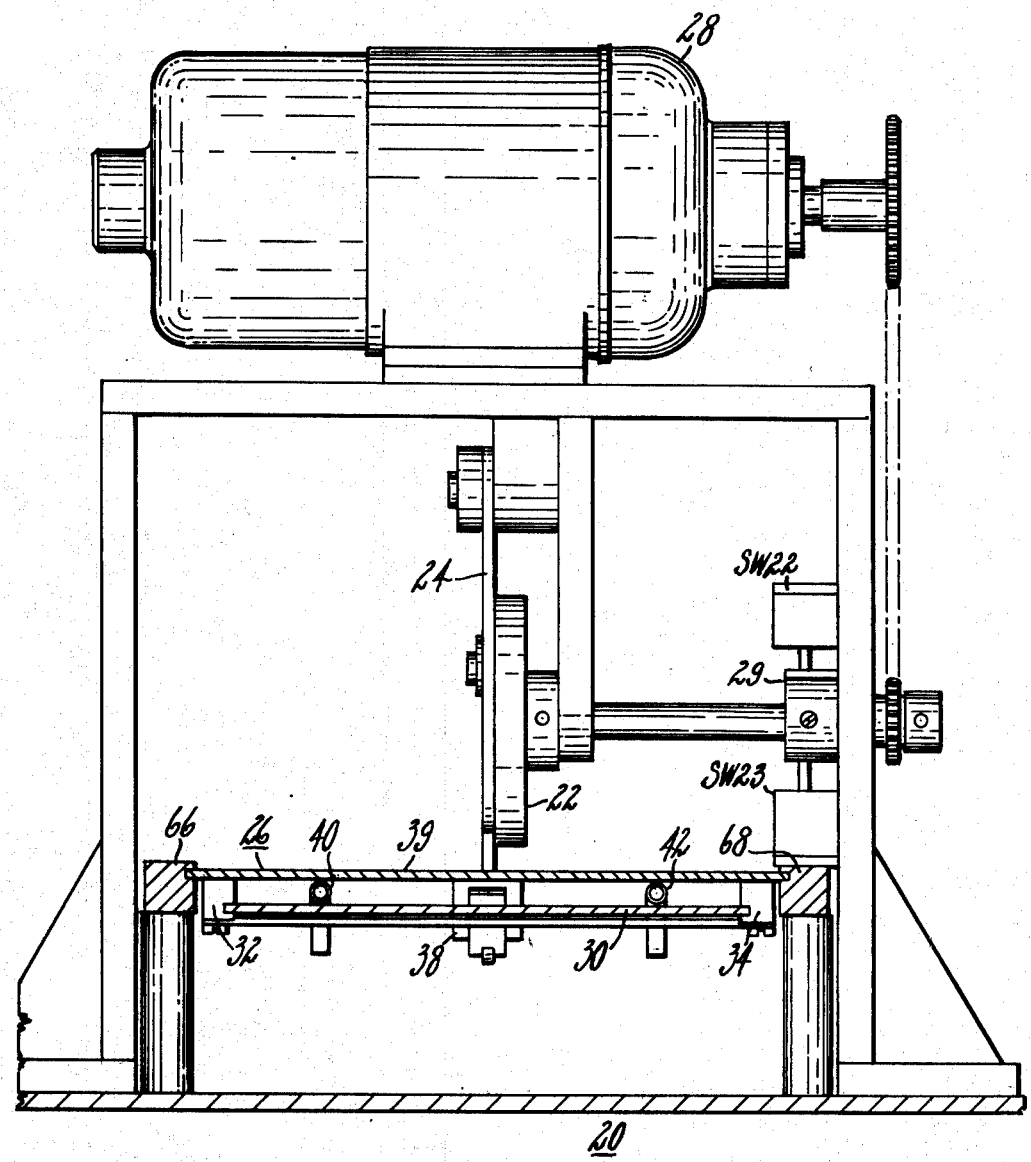
Fig. 2 is a view, in section, taken on line 2—2 of Fig. 1.
Figure 3:
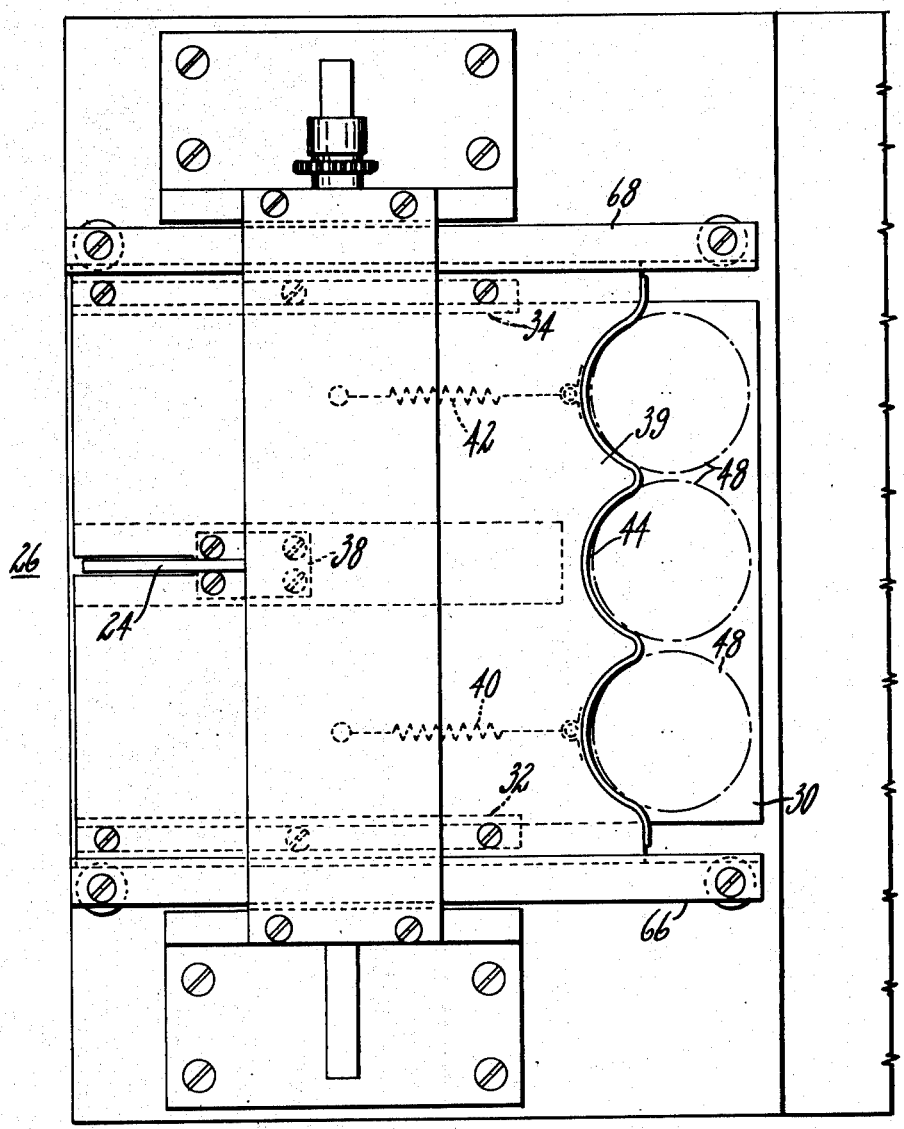
Fig. 3 is a sectional view taken on line 3—3 of Fig. 1.
Figure 4:
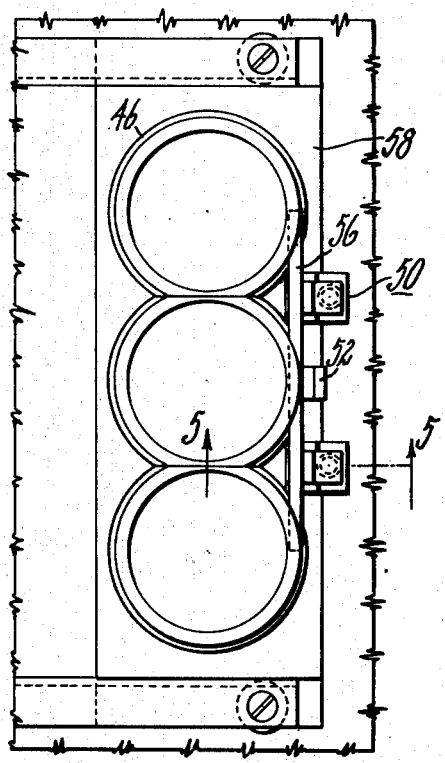
Fig. 4 is a fragmentary view of the supply means for the delivery apparatus taken in the direction of arrow marked 4 on Fig. 1.
Figure 5:
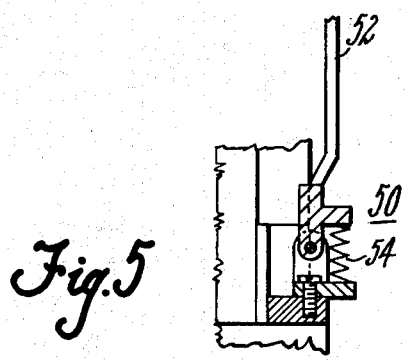
Fig. 5 is a section taken on line 5—5 of Fig. 4.

Referring specifically to the drawings, a supply or delivery unit 20 is shown in Fig. 1 and includes a cam 22 and cam operated lever 24 that in turn operates a slide mechanism 26 when actuated by a motor 28. The mechanism 26 is shown in Fig. 3 and includes a plate 30 slidable in ways 32 and 34 wherein the plate 30 is pushed forwardly by the action of cam operated lever 24 through lever 36 attached to a lug 38 carried by pusher plate 39. Plate 30 and plate 39 move as a unit during a portion of their movement whereupon plate 30 stops and plate 39 continues to move against a pair of springs 40 and 42 which are provided for pulling the plate 39 back from its advanced forward position. At the front end of the plate 39 is a curved pusher bar 44 having in this embodiment three curved portions therein. Above each of the curved portions is a stack or supply bin 46 which may be filled with preforms or "pills" as shown in dotted lines at 48 in Fig. 3. A clamping means 50, having a lever 52 spring actuated by spring 54 and controlling a horizontal bar 56, is provided which holds the stacks 46 in the base portion 58 of the stack assembly and permits limited vertical adjustment so that pills of different thickness may be used in the feeder.

When the pills or preforms are put in the stacks 46, the lower ones rest on the bottom plate 30 which moves concurrently with the upper plate 39 that carries the pusher plate 44. Thus plate 39, with its pusher 44 and plate 30, moves outwardly with a pill thereon as shown in Fig. 7. The lower plate 30 however reaches its limit of movement when it comes adjacent to an electrode plate 62. However, the upper or pusher plate 39 continues to move outwardly against the springs 40 and 42, fastened to plate 30, to push the pill 48 onto the electrode 62 and simultaneously push any heated pill 48a off the plate and onto a chute 64 for delivery to a bin or die. Upon reverse motion of the cam operated mechanism of the delivery means, the springs 40 and 42 retract the pusher plate 39 and pusher bar 44 to a position relative to plate 30 shown in Fig. 7, whereupon plate 30, pusher plate 39 and pusher bar 44 move into position shown in Fig. 3 as a unit.

Upon each rotation of cam 22, the delivery motion is repeated. It will be noted from Fig. 3 that the pusher plate 39 slides in ways 66 and 68. The motor 28 for actuating the delivery mechanism is controlled by the electrical circuit to be described hereinafter.

While the embodiments of the present invention as herein disclosed, constitute preferred forms, it is to be understood that other forms might be adopted.

What is claimed is as follows:

1. A feeding mechanism for preforms comprising, in combination, a magazine adapted to carry a supply of preforms vertically disposed therein and having an opening at the bottom thereof of sufficient height to permit a preform to pass therethrough, a feeder consisting of a bottom plate upon which said preform at the bottom of the stack rests and a pusher plate thereon, said pusher plate being adapted to move laterally for transferring said preform from the stack to another position, said pusher plate and said bottom plate moving as a unit through a predetermined portion of their lateral movement whereupon the bottom plate becomes stationary and the pusher continues to move to push the preform off the bottom plate, and then return to its position relative to the bottom plate whereupon the pusher plate and the bottom plate move back as a unit, and a wall at the top of the pusher plate disposed parallel to said bottom plate for holding the supply of preforms in said stack after said bottom preform has been transferred until such time as the pusher plate has been retracted beyond the bottom of the stack whereby another operation may be initiated.

2. A feeding mechanism for a plurality of similar parts adapted to be carried in stacked relation, comprising in combination; a supply means adapted to carry a supply of parts substantially vertically disposed therein and having an opening adjacent the bottom thereof of sufficient height to permit one of said parts to pass therethrough substantially laterally of the supply means, a feeder consisting of a bottom plate upon which said part at the bottom of the stack rests and a pusher plate thereon, said pusher plate being adapted to move laterally for transferring said part from the supply means to another position, said pusher plate and said bottom plate moving concomitantly through a predetermined portion of their lateral movement whereupon said bottom plate becomes stationary and the pusher plate continues to move to push the part off the bottom plate and then returns to its original position relative to the bottom plate whereupon the pusher plate and the bottom plate return concomitantly as a unit to their starting position, and means on said pusher plate disposed substantially parallel to said bottom plate for maintaining the supply of parts in said supply means in position after said bottom part has been transferred therefrom and until such time as the pusher plate has been returned beyond the bottom of the stack whereby another operation may be initiated.

References Cited in the file of this patent

UNITED STATES PATENTS

| Number | Name | Date |
|---|---|---|
| 568,201 | Latham | Sept. 22, 1896 |
| 587,117 | Estabrook | July 27, 1897 |
| 951,304 | Clark et al. | Mar. 8, 1910 |
| 972,649 | Rose | Oct. 11, 1910 |
| 1,760,234 | Frederick | May 27, 1930 |
| 1,869,653 | Bauer | Aug. 2, 1932 |
| 1,900,573 | McArthur | Mar. 7, 1933 |
| 2,179,261 | Keller | Nov. 7, 1939 |
| 2,228,614 | Soubier et al. | Jan. 14, 1941 |
| 2,304,958 | Rouy | Dec. 15, 1942 |
| 2,363,724 | Ford | Nov. 28, 1944 |
| 2,385,311 | Strauss | Sept. 18, 1945 |
| 2,467,440 | Meharg et al. | Apr. 19, 1949 |
| 2,561,529 | Mongan, Jr., et al. | July 24, 1951 |